May 8, 1962           J. F. JOHNSON           3,033,990
PHOTOELECTRIC SCANNING METHOD AND APPARATUS
Filed Aug. 2, 1957           3 Sheets-Sheet 1
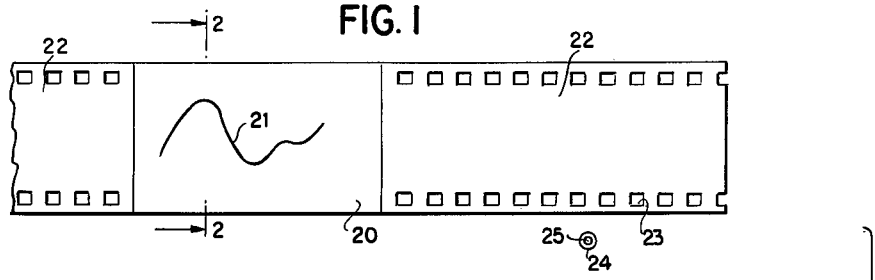
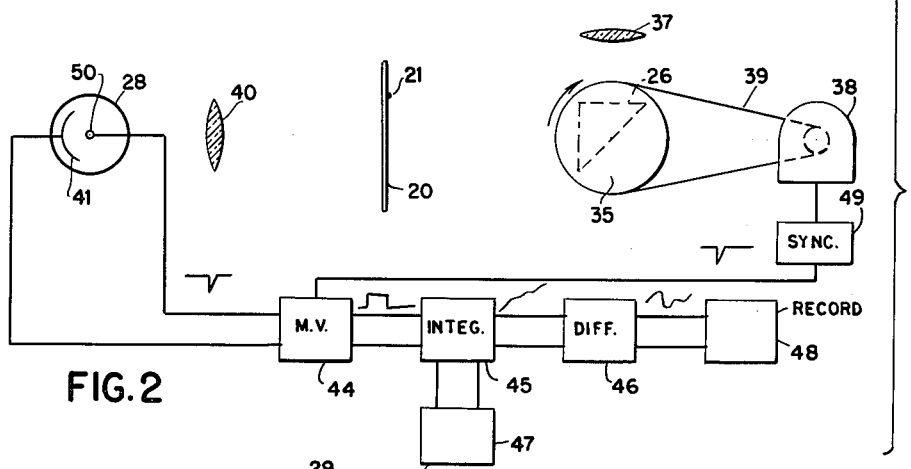
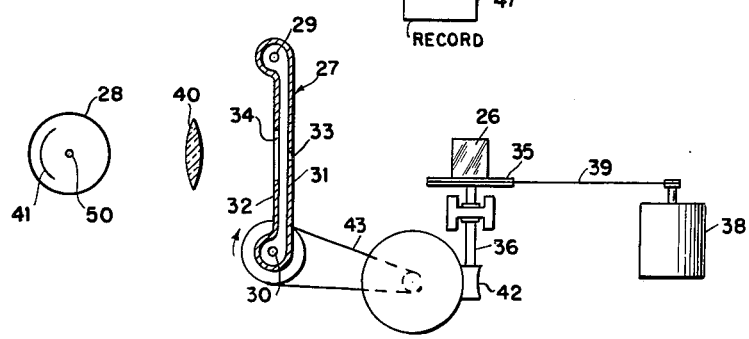
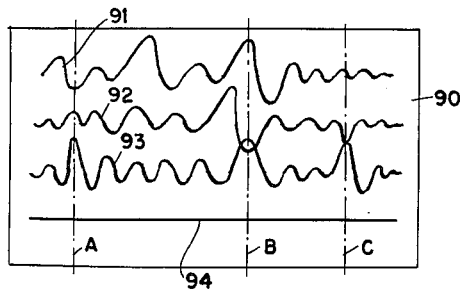
*INVENTOR.*
James F. Johnson
BY
Adams, Forward and McLean
ATTORNEYS INVENTOR.
James F. Johnson May 8, 1962  J. F. JOHNSON  3,033,990
PHOTOELECTRIC SCANNING METHOD AND APPARATUS
Filed Aug. 2, 1957  3 Sheets-Sheet 3

INVENTOR.
James F. Johnson
BY
Adams, Forward and McLean
ATTORNEYS

United States Patent Office 3,033,990
Patented May 8, 1962

3,033,990
PHOTOELECTRIC SCANNING METHOD AND APPARATUS
James F. Johnson, Tulsa, Okla., assignor to Sinclair Oil & Gas Company, Tulsa, Okla., a corporation of Maine
Filed Aug. 2, 1957, Ser. No. 676,016
5 Claims. (Cl. 250—219)

My invention relates to the analysis of technical information and in particular provides a method and device for generating an electrical signal which is a function of any desired graphically recorded information.

For many years technical information, for example operating data relating to the performance of a machine, has been recorded in graphical form, that is, as a trace inked or otherwise marked on a surface, such as that of a roll of paper. In many instances more than one such trace is marked simultaneously to record the simultaneous occurrence of separate, although related events. Typical of the latter are multi-trace seismograms which are produced in seismic prospecting. Frequently, it is desirable in the analysis of technical information to utilize the information in the form of an electrical signal. As a result, more recently such information has been recorded on magnetic tapes and the like from which it can be directly reproduced as an electrical signal to obviate the difficult conversion of the information from graphical to electrical form. Nevertheless, particularly in the case of seismograms, information previously recorded in graphical form is still useful, and for that reason there is substantial demand for a method and device capable of converting a trace graphically recorded on a surface into a useful electrical signal.

It is therefore an important object of my invention to provide a method and device capable of converting graphically recorded information into useful electrical signals.

In a more particular aspect it is an important object of my invention to provide a device and method for scanning time base graphs and the like to develop an electrical output which is equivalent to the integral of the scanned trace or traces forming the graph, that is, a function of the envelope of such trace or traces with respect to some base line, or an electrical output which itself is equivalent to the scanned trace.

In a still more specific aspect it is an object of my invention to provide such a device and method which can incorporate corrections and other modifications at the same time the graphically recorded data are reproduced electrically.

It is still another object of my invention to provide such a device and method which develop simultaneous and separate electrical signals corresponding to separate, graphically recorded information, such as typically found in multi-trace seismograms.

These and other objects of my invention are essentially achieved by sequentially scanning the graphically recorded data with a point of light through a series of scans displaced incrementally along a coordinate, such as the time base of a seismogram. The successive scans are each carried transversely to the time base or other coordinate, as well as being incrementally displaced along the coordinate. At the same time I generate a series of electrical pulses synchronized with the scanning rate. As each scan of light crosses the recorded data, the passage time to each trace is sensed, suitably by a photo-sensitive element positioned to receive light transmitted through or reflected by the sheet on which the trace is recorded. The sensed passage time is utilized to modulate the length in time of the electrical pulse generated for the particular scan. Thus the series of pulses have lengths which are a function in time of the amplitude of the graphically recorded trace in the direction of the scan. The series of pulses accordingly are suitably demodulated, preferably by coupling the pulse length modulated signal to an integrating circuit, the output of which can be recorded, fed to a differentiating circuit to produce an electrical output corresponding in amplitude to the amplitude of the graphically recorded trace, or otherwise utilized. Normally at some point subsequent to integration, the electrical signal will be recorded on magnetic tape or the like, or else directly utilized in electrical analysis of the information contained by the recorded trace. It is not always necessary, however, to demodulate the pulse length modulated signal, since frequently such a signal is directly useful. Thus, if it is desired to digitize the graphically recorded data, the pulse length modulated signal is simply fed to a counter which counts the length of each pulse against a time base.

For a more complete understanding of the practical application of the principles of my invention, reference is made to the appended drawings in which:

FIGURE 1 is a plan view of a graph suitable for use in accordance with my invention;

FIGURE 2 is a schematic elevational view of an apparatus constructed in accordance with my invention for converting the data on the graph shown in FIGURE 1 into an electrical signal, the graph itself being shown in cross-section, taken at line 2—2 in FIGURE 1;

FIGURE 3 is a plan view of the apparatus shown in FIGURE 2;

FIGURE 4 is a plan view of a typical multi-trace graph suitable for use in accordance with my invention;

Figure 5:
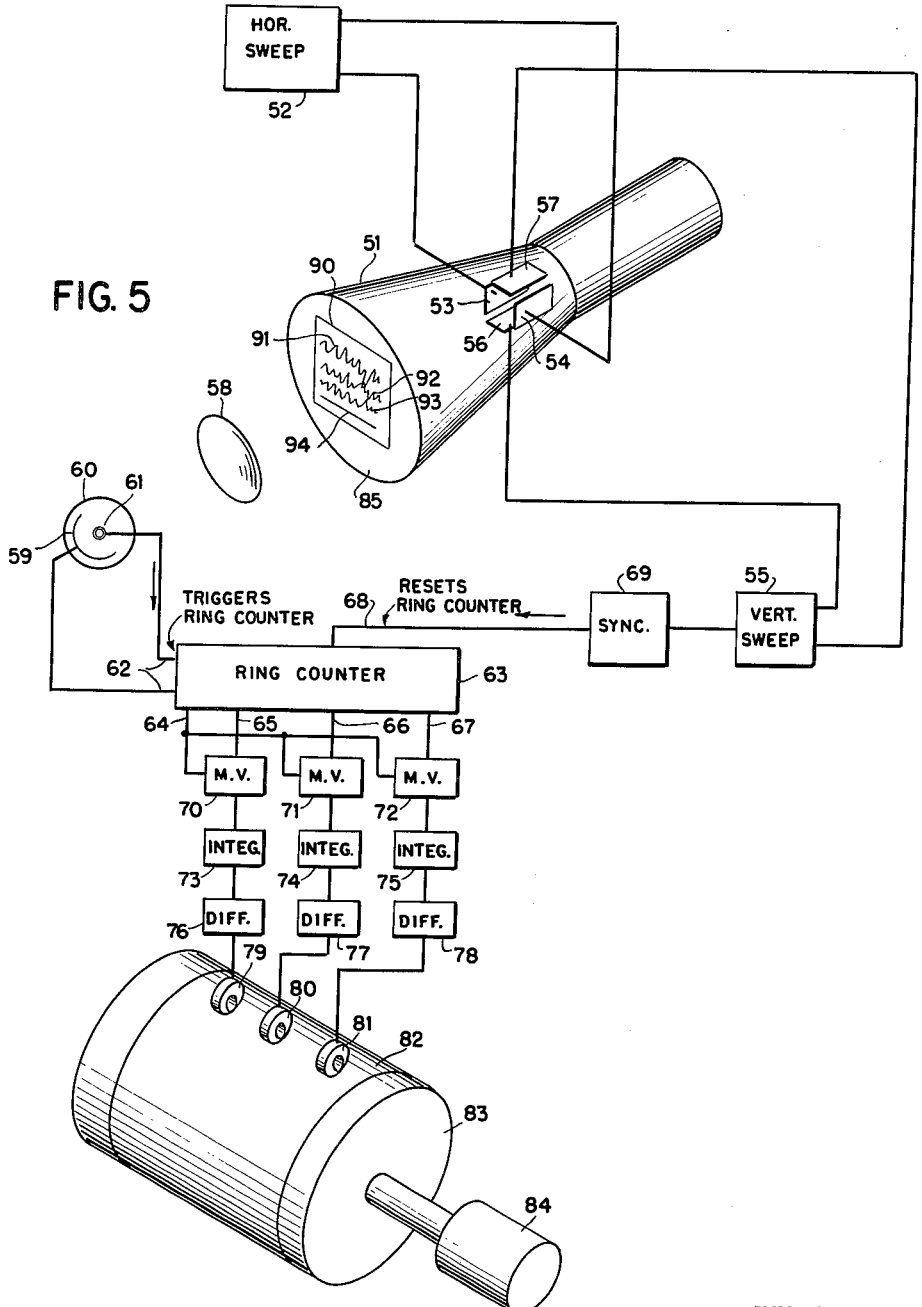
FIGURE 5 is a diagrammatic and schematic view of an apparatus constructed in accordance with my invention for converting the several traces shown in FIGURE 4 to electrical signals and for recording the same.

Referring to FIGURE 1 the reference numeral 20 designates a sheet of paper on which has been inked a trace 21 portraying the transient variations in magnitude, plotted vertically, of a condition with reference to time which is plotted lengthwise of paper 20. Each end of paper 20 is cemented to a separate lead strip 22 having suitable perforations 23 spaced along its lengthwise margins for receiving sprocket teeth of a driving spindle.

Referring to FIGURES 2 and 3 the apparatus employed includes a light source which is a projection lamp 24 (not shown in FIGURE 3) having an elongated filament 25 disposed in a horizontal plane, a reflecting prism 26, a reeling device 27 (not shown in FIGURE 2), and a phototube 28.

Reeling device 27, referring more particularly to FIGURE 3, is provided with an idler spindle 29 at one end and a drive spindle 30 at the other end, each suitably provided with sprockets for receiving perforations 23. Intermediate of its ends reeling device 27 includes a pair of side walls 31 and 32 which are closed together at each end of reeling device 27 to enclose spindles 29 and 30. One side wall 31 is provided with a fine vertical slit 33 which faces reflecting prism 26. Side wall 32 is provided with a larger opening 34 which faces phototube 28.

Reflecting prism 26 is cemented to a pulley 35 which is mounted for rotation fixed on a shaft 36. The position of prism 26 is arranged such that the light from lamp 24, suitably focused by lens 37, is cast by prism 26 as a fine horizontal line on side wall 31 of reeling device 27 crossing vertical slit 33. As shaft 36 is revolved and prism 26 rotates clockwise as seen in FIGURE 2, the line of light cast on side wall 31 periodically sweeps upwardly across wall 31. Since slit 33 is perpendicular to the line of light thus cast on end wall 31, only a ray of light, periodically sweeping vertically, passes through slit 33. Suitably, prism 26 is so rotated by a motor 38 which is connected to drive pulley 35 by a belt drive 39.

Light passing through slit 33, if uninterrupted, passes through opening 34 and is collected by lens 40 to impinge upon the photoemissive cathode 41 of phototube 28.

The arrangement of mechanical apparatus also includes a drive mechanism for spindle 30 drawing power from a worm 42 on the end of shaft 36 opposite pulley 35 through a suitable drive transmission 43.

Electrically the apparatus includes a multivibrator circuit 44, an integrating circuit 45, a differentiating circuit 46, a pair of recorders 47 and 48, and a sync generator 49.

Sync generator 49 is mechanically connected to motor 38, suitably including a cam operated micro-switch or the like, and develops an output voltage including a sharp negative pulse synchronized with the rotation of prism 26 to occur at each moment the beam of light cast on end wall 31 begins traversing upwardly across slit 33. The pulsed output of sync generator 49 is coupled to multivibrator circuit 44, to initiate the leading edge of the square wave output of multivibrator 44. Cathode 41 and anode 50 of phototube 28 are similarly coupled to the other side of multivibrator circuit 44 to trigger the following edge of the square wave upon a sharp reduction in the output of tube 28. The square wave output of multivibrator circuit 44 is coupled to integrating circuit 45, the electrical output of which is in turn connected to drive magnetic recorder 47 and is also coupled to differentiating circuit 46, the electrical output of which is connected to drive magnetic recorder 48.

In operation, one lead strip 22 attached to paper 20 is reeled on spindle 29 and positioned in reeling device 27 with the edge of paper 20 which joins the other lead strip 22 coinciding with slit 33. The other lead strip 22 is secured on spindle 30 such that upon starting motor 38, which causes spindle 30 to rotate clockwise as seen in FIGURE 3, the portion of paper 20 carrying curve 21 will be carried past slit 33. With the electrical circuits actuated and lamp 24 lighted, motor 38 is then started.

The consequent rotation of prism 26 periodically casts a horizontal beam of light from the bottom to the top of side wall 31, thus allowing a ray of light to pass through slit 33 from bottom to top. At the same time, spindle 30 is rotated, drawing curve 31 past slit 33. Thus each sweep of light scans a new increment of paper 20. Since paper 20 is translucent to a degree, the beam of light passing through slit 33 passes through paper 20 and opening 34 and is collected by lens 40 to impinge upon the photoemissive element 41 of phototube 28. It will be evident that the output of phototube 28 will therefore be a steady voltage for each sweep of the light beam but will have a sharp negative pulse coinciding with the passage of the light beam across trace 21, which is relatively more opaque to light. The sweep frequency must be related to the rate movement of paper 20 such that the incremental distance between sweeps is small compared to the rate of change of curve 31.

The square wave output of multivibrator 44 thus triggered by pulses alternately delivered by sync generator 49 and phototube 28 can be considered to consist of a series of spaced, positive pulses, each of which is initiated in synchronization with each sweep of the light beam. Each such pulse terminates when its associated sweep of the light beam crosses trace 21. The length of each of the spaced, positive pulses of the multivibrator output, therefore, corresponds in time to the amplitude of trace 21 above a theoretical horizontal base line at the particular vertical line of the associated sweep of the light beam.

Suitably, integrating circuit 45 has a time constant larger than the time between sweeps and less than one-half cycle of the highest frequency to be resolved. The electrical output of integrating circuit 45, which is continuously recorded at 47 or alternatively continuously differentiated at 46, is accordingly a running integral.

The time constant of differentiating circuit 46 on the other hand is substantially greater than the lowest rate of change in trace 21 which is to be resolved. Consequently the electrical output of differentiating circuit 46 corresponds to the amplitude pattern of trace 21. Thus, the signal recorded at 48 is the electric equivalent of curve 21.

Referring to FIGURE 5, there is shown an apparatus constructed in accordance with my invention which is more suitable for converting simultaneously into a series of separate signals the amplitude patterns of a multi-trace graph, such as that shown in FIGURE 4.

The apparatus shown in FIGURE 5 includes a cathode ray tube 51 including a low persistence, fluorescent viewing screen 85 and suitable external electrical powering circuits of conventional construction as well as a horizontal sweep generator 52 for feeding a suitable saw-tooth control voltage to horizontal deflection plates 53 and 54 and a suitable vertical sweep generator 55 for feeding a saw-tooth control voltage to vertical deflection plates 56 and 57.

Typically the frequency of the saw-tooth wave output of horizontal sweep generator 52 corresponds to the original linear rate of marking the graph to be converted to an electrical signal. Thus, if the graph were photoprinted at a rate of two inches per second and the length to be scanned were six inches, a three-second cycle of saw-tooth output from generator 52 would be preferred. The sawtooth wave output of vertical generator 55 on the other hand should be substantially greater than the highest frequency recorded. In seismic work a frequency of 50 kilocycles per second is desirable. Retrace of the cathode ray beam after each vertical sweep must be blanked. Since ordinarily only one cycle of generator 52 is required, synchronization between generators 52 and 55 is usually unnecessary. It is desirable, however, to synchronize the beginning of the horizontal sweep output wave of generator 52 with the recording apparatus. Among other ways, such synchronization can be accomplished utilizing the arrangement described in copending application Serial No. 652,460, filed April 12, 1957, by Donald C. Bowman.

A collecting lens 58 is conveniently positioned to focus light emitted by the screen 85 of cathode ray tube 51 on the photoemissive cathode 59 of a phototube 60. Cathode 59 and the anode 61 of phototube 60 are connected in the trigger circuit 62 of a ring counter 63. Ring counter 63 in the illustrated case is provided with four separate output circuits 64, 65, 66 and 67, such that a series of triggering pulses introduced to the ring counter by phototube 60 will successively trigger the separate output circuits in the noted order. Ring counter 63 is also provided with a reset circuit 68 which, when pulsed, resets ring counter 63 to cause the next pulse in trigger circuit 62 to activate output circuit 64. A pulse generator 69 is connected such that it is triggered at the beginning of each positive saw-tooth in the saw-tooth output wave of vertical sweep generator 55. Pulse generator 69 thus delivers a sharp pulse to reset circuit 68 to synchronize counter 63 such that at the beginning of each vertical sweep of the cathode ray beam in tube 51, ring counter 63 resets to commence operating at output circuit 64.

Output circuit 64 is coupled to each of multivibrators 70, 71 and 72 to trigger the leading edge of the square wave output of each of the multivibrators. Output circuit 65 of ring counter 63 is connected to multivbrator 70 to trigger the following edge, i.e., terminate a positive pulse. Similarly, output circuits 66 and 67 are coupled, respectively to multivibrators 71 and 72 to trigger following edges in their respective outputs. The pulsed output of each of multivibrators 70, 71 and 72 is respectively coupling to an integrating circuit 73, 74 and 75, the electrical output of each of which in turn is respectively coupled to a differentiating circuit 76, 77 and 78.

The electrical output of each of differentiating circuits 76, 77 and 78 is respectively coupled to drive a magnetic tape recording head 79, 80 and 81. Recording heads 79, 80 and 81 are mounted in a line with their gaps in close proximity to a magnetic recording film 82 mounted on a drum 83 which is rotated by a motor 84. The recording equipment is, of course, conventionally employed in making electrical recordings of multiple simultaneous signals, such as are obtained in conventional seismic prospecting.

In operation a typical, photo-printed oscillogram 90, such as shown in FIGURE 4, having three printed traces 91, 92 and 93, is positioned on the face of screen 85. In the illustrated case, it will be observed that traces 91, 92 and 93 were printed with reference to parallel base lines. In addition, for reasons which will become apparent hereinafter, oscillogram 90 was prepared by including a straight base line 94 parallel to the theoretical bases of traces 91, 92 and 93. Oscillogram 90 is positioned on the face of screen 85 with base line 94 in horizontal position. Suitably, the area remaining on viewing face 85 which is not covered by oscillogram 90 is masked, and the values of deflection voltages are adjusted, particularly in the case of the vertical deflection voltage, to keep the cathode ray beam within the area covered by oscillogram 90. Preferably the entire appparatus, including cathode ray tube 51, collecting lens 58 and phototube 60, are located in a darkened room or are otherwise enclosed to prevent light other than from screen 85 from striking phototube 60.

With the apparatus in operation, the deflection voltages applied to plates 53, 54, 56 and 57 carry the cathode ray beam vertically from bottom to top and horizontally from left to right behind oscillogram 90. Thus in effect the point of fluorescent light appearing on the face of screen 85 scans oscillogram 90 in the same manner as paper 20 was scanned in the arrangement of FIGURES 2 and 3. It will be noted, however, that employment of a cathode ray beam for controlling scanning provides certain advantages since additional circuits can be employed to control the sweep rates or shape of the deflecting voltages, or both, to compensate for factors, such as stepout in seismic work and variable recording rates in forming the original oscillogram 90.

In any event, the point of light cast by the cathode ray beam on screen 85 as it moves behind oscillogram 90 causes the output of phototube 60 to consist of a steady voltage having a series of irregularly spaced sharp negative pulses corresponding to the passage of the light point on screen 85 behind the various curves 91, 92 and 93 and behind base line 94.

Figure 6:
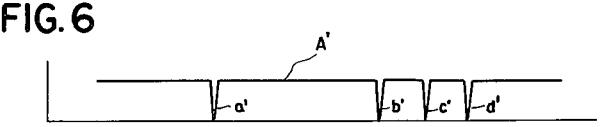
FIGURE 6 is a graph showing the electrical output of phototube 60 shown in FIGURE 5 at event A designated in FIGURE 4.

Referring to FIGURE 4, when the point of light follows scan A, the output of phototube 60, as illustrated in FIGURE 6 by curve A', includes a sharp negative pulse at $a'$ corresponding to base line 94, and a pulse at time $b'$, a pulse at time $c'$ and a pulse at time $d'$, respectively, corresponding to the passage of the point of light behind traces 93, 92 and 91.

Figure 7:
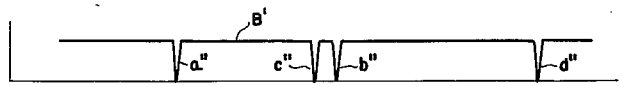
FIGURE 7 is a graph showing the electrical output of phototube 60 at event B in FIGURE 4.

FIGURE 7 shows a curve B' representing the output of tube 60 when the point of light passes through scan B in FIGURE 4 during which traces 92 and 93 overlap. It will be noted that the corresponding negative pulses at times $a''$, $b''$, $c''$ and $d''$ formed as the light passes respectively beneath line 94 and traces 93, 92 and 91 do not appear in the same order as in FIGURE 6 because of the overlap in traces 92 and 93. It will also be observed that time $a''$ coincides with time $a'$ since the base line 94 is horizontal, but that the pulses at times $b''$, $c''$ and $d''$ vary from the positions of the pulses at times $b'$, $c'$ and $d'$ because of the variation in amplitude of traces 93, 92 and 91, respectively. For reasons which will become apparent hereinafter, the inverse sequence of times $b''$ and $c''$ is of no particular consequence. Thus, also when the point of light crosses a point at which a pair of traces are tangent such that only a single pulse is produced for the two traces, no serious disturbance in results is obtained.

Figure 8:
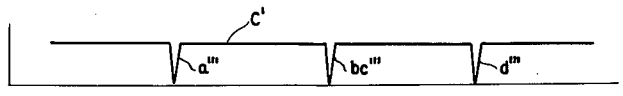
FIGURE 8 is a graph showing the electrical output of phototube 60 at event C in FIGURE 4.

FIGURE 8 in particular illustrates the last occurrence, and shows the output of phototube 60 as a curve C' when the point of light behind oscillogram 90 follows scan C (see FIGURE 4). In scan C it will be observed that the point of light first crosses base line 94 causing a sharp negative pulse at time $a'''$ in output C'. Scan C then crosses a point of tangency of traces 93 and 92 producing only a single negative pulse at time $bc'''$ for the two traces. Thereafter, a third negative pulse is caused at time $d'''$ in the output C' of phototube 60 as the point of light in scan C crosses behind trace 91.

The continuous pulsed output of phototube 60 is, as indicated above, coupled to trigger circuit 62 of ring counter 63. In normal operation, as each vertical scan is commenced, a synchronizing pulse coupled from vertical sweep oscillator 55 by sync (pulse) generator 69 to reset circuit 68 resets ring counter 63. Thus, for every sweep of the cathode ray beam and hence every scan of the point of light on screen 85 behind oscillogram 90, the first negative pulse in the output of phototube 60, for example, the pulse at time $a'$ during scan A, causes a pulse in output circuit 64 of ring counter 63.

Figure 9:
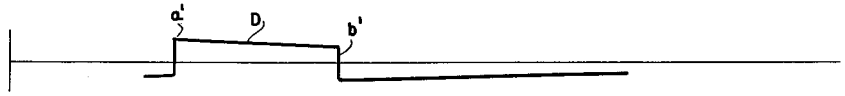
FIGURE 9 is a graph showing the electrical output of multivibrator 70 shown in FIGURE 5 at event A.
Figure 10:
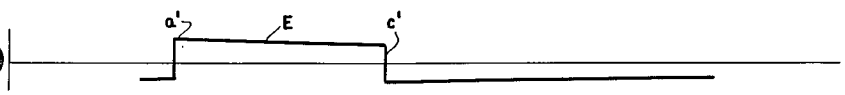
FIGURE 10 is a graph showing the electrical output of multivibrator 71 shown in FIGURE 5 at event A.
Figure 11:
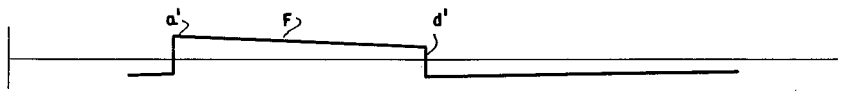
FIGURE 11 is a graph showing the electrical output of multivibrator 72 shown in FIGURE 5 at event A.

As indicated above, output circuit 64 is coupled to each of multivibrators 70, 71 and 72 to trigger a leading edge in the output of each such multivibrators. Referring particularly to FIGURES 9, 10 and 11, curve D represents a portion of the output of multivibrator 70, curve E represents a portion of the output of multivibrator 71, and curve F represents a portion of the output of multivibrator 72. It will be noted that during scan A at the instant $a'$, each of multivibrators 70, 71 and 72 is therefore triggered to a leading edge. Again continuing with scan A, as the negative pulse at time $b'$ is fed to trigger circuit 62 of ring counter 63, a pulse is produced in output circuit 65 of ring counter 63 which is coupled to multivibrator 70 to initiate a following edge in its output D at instant $b'$. Similarly, the negative pulse in output A' at instant $c'$ through output circuit 66 of ring counter 63 triggers a following edge at instant $c'$ in output E of multivibrator 71, and at instant $d'$, a following edge is triggered in the output F of multivibrator 72.

The output of each of multivibrators 70, 71 and 72 is therefore a series of positive pulses which begin at a regular periodic rate and which have lengths in time corresponding to the distance from base line 94 to a particular trace 91, 92 or 93. The output D is thereby associated with the amplitude of the first trace (trace 93) crossed. Similarly, output E is identified with the second trace (trace 92) crossed, and the output F is identified with the third trace (trace 91) crossed. During events, such as scan B, for a moment the outputs D and E will be associated with a different trace than therebefore or after. However, such overlaps usually are not great nor of long duration, and the small deviations in the outputs D and E have no serious consequence. Similarly, in a scan such as scan C, output E momentarily becomes associated with a second trace, and output F is not triggered to end the positive pulse. No deviation in output E ordinarily will occur because output is also associated with the same trace as before and after the event. Also the failure to trigger the negative pulse in output F causes only a momentary disturbance since multivibrators 70, 71 and 72 are forced to reset along with ring counter 63 by the sync pulse.

Figure 12:
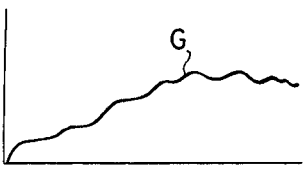
FIGURE 12 is a graph showing the electrical output of integrating circuit 73 shown in FIGURE 5.
Figure 13:
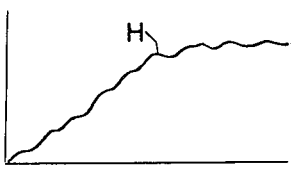
FIGURE 13 is a graph showing the electrical output of integrating circuit 74 shown in FIGURE 5.
Figure 14:
FIGURE 14 is a graph showing the electrical output of integrating circuit 75 shown in FIGURE 5.

The pulse length modulated outputs of multivibrators 70, 71 and 72, as indicated above, are respectively coupled to integrating circuits 73, 74 and 75 which have time constants equal to the time of one-half cycle of the highest frequency of traces 91, 92 and 93 which is to be reproduced, and also substantially greater than the sweep time. In seismic work a time constant of 0.005 second is thus preferred. Longer time constants can of course be employed. Since the length of each of the various positive pulses in outputs D, E and F corresponds in time to the vertical distance of a trace above a base line through an incremental horizontal distance, the outputs of the various integrating circuits will be time functions of the continuous summations of areas under the several traces as the scanning light moves from left to right across oscillogram 90. Accordingly, the output of integrating circuit 73, which is a function of the area under trace 93 and over line 94 will be a curve G as shown in FIGURE 12. Similarly the outputs of integrating circuits 74 and 75, which correspond respectively to the areas under traces 92 and 91, are shown as curves H and J in FIGURES 13 and 14.

Figure 15:
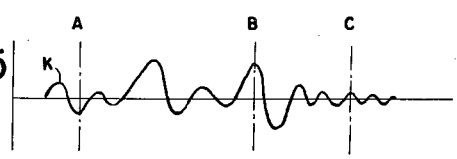
FIGURE 15 is a graph showing the electrical output of differentiating circuit 76 shown in FIGURE 5.

Outputs G, H and J are respectively coupled as indicated in the drawing to differentiating circuits 76, 77, and 78, respectively, which have time constants equal to about two cycles of the lowest frequency of change in traces 91, 92 and 93, which it is desired to reproduce. In seismic work a time constant of 0.5 second is preferred. The electrical outputs K, L and M of integrating circuits 76, 77 and 78, respectively, accordingly are substantial duplicates of traces 93, 92 and 91, respectively. The last outputs are illustrated in the drawings in FIGURES 15, 16 and 17, respectively.

Figures 16, 17:
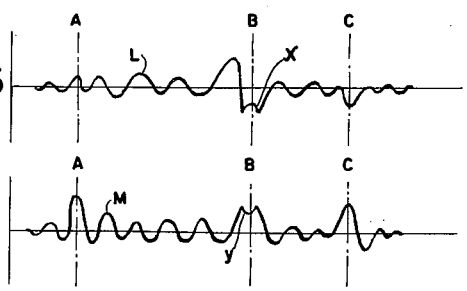
FIGURE 16 is a graph showing the electrical output of differentiating circuit 77 shown in FIGURE 5.
FIGURE 17 is a graph showing the electrical output of differentiating circuit 78 shown in FIGURE 5.

It will be observed in FIGURE 16 that the overlap in traces 92 and 93 crossed by scan B produce a momentary, although substantially inconsequential, distortion in curves L and M, as indicated in FIGURES 16 and 17 by the reference letters *x* and *y* respectively. It will be further observed that the momentary tangency of traces 92 and 93 has no substantial effect on output curves K, L, or M.

From the foregoing it will be seen that my invention generally provides a method and apparatus which can be used to convert almost any graphically recorded information into a continuous electrical signal. Although I have described only Cartesian coordinate diagrams, polar coordinate graphs and other variations are obviously adaptable to my invention. Similarly, although I have shown only situations where light transmission is utilized, since most graphs are made on semi-translucent paper, obviously, if the graph is on substantially opaque material, the sensing of light absorbed by the traces can be observed by collecting reflected light, rather than transmitted light.

It will also be noted, particularly with reference to the arrangement of FIGURE 5, that when long multitrace records are to be converted to electrical signals, although a cathode ray tube scanner is preferred, it is also preferable to sweep the cathode ray transversely of the record only and to move the record as in the arrangement of FIGURES 1 and 2 to obtain the longitudinal movement of the record relative to the scanner.

While I have referred to the generation of pulses by multivibrators, other oscillators capable of controlled square wave output can readily be used. Indeed, a trigger circuit, such as the Eccles-Jordan circuit can obviously be substituted.

I claim:

1. A method for generating an electrical signal from a trace graphically recorded on a surface which includes sequentially scanning said surface through a series of positions incrementally displaced along said trace, sensing passage of each scan across said trace to determine the passage time of each said scan as it crosses said trace, generating a series of electrical pulses, one for each scan, each said pulse having a time length which is a function of said passage time for the scan associated with such pulse, integrating said series of pulses and thereafter differentiating the integral thereby obtained to produce an electrical signal having amplitude variations corresponding to the shape of said trace.

2. A method according to claim 1 in which said trace is a continuous curve displaying selected information or data with reference to a linear base line, and in which each successive scan is incrementally displaced along said base line.

3. An apparatus for generating an electrical signal from a trace graphically recorded on a surface, which apparatus includes means for sequentially scanning a point of light across said surface through a series of positions incrementally displaced along said trace, light sensitive means positioned to sense absorption of light as each said scan crosses said trace to determine the passage time of each scan of said point of light as it crosses said trace, means generating a series of electrical pulses, one for each scan of said point of light, said pulse generating means being operatively coupled with said light sensitive means whereby the time length of each pulse is a function of said sensed passage time for the associated scan of said point of light, integrating means having a continuous electrical output and operatively coupled with said pulse generating means, and differentiating means having a continuous electrical output and operatively coupled to the output of said integrating means whereby said electrical output of said differentiating means is a function of said trace.

4. An apparatus for generating a plurality of electrical signals, each associated with a different one of a plurality of traces graphically recorded on a surface, which apparatus includes means for sequentially scanning a point of light across said surface through a series of positions incrementally displaced along said traces, light sensitive means having an output circuit for generating in said output circuit a first electrical signal which is a function of the intensity of light impinging against said light sensitive means, said light sensitive means being positioned to view said point of light on said surface whereby said first signal in said output circuit of said light sensitive means will include a series of pulses, each pulse occurring at the time said point of light crosses one of said traces, a ring counter having an input circuit, a reset circuit and a plurality of output circuits, said output circuits of said ring counter being actuated one at a time in a predetermined sequence in response to a series of pulses applied to said input circuit of said ring counter, said ring counter being responsive to a pulse signal applied to said reset circuit to reset said sequence at an initial position, said output circuit of said light sensitive means being coupled to said input circuit of said ring counter whereby said first electrical signal is applied to said ring counter to actuate sequentially said output circuits of said ring counter, means coupled to said reset circuit applying thereto a pulsed signal synchronized with the scanning rate of said point of light to actuate said reset circuit, a plurality of pulse generating means, each said pulse generating means having a trigger circuit and an output circuit for generating a series of electrical pulses, means coupled to said pulse generating means synchronized with the scanning rate of said point of light for triggering each said pulse generating means to one mode of the pulsed signal in the output circuit of said pulse generating means, said trigger circuit of each said pulse generating means being coupled to a different one of said output circuits of said ring counter whereby actuation of an output circuit of said ring counter will trigger the pulse generating means coupled therewith to a second mode of the pulsed signal in the output circuit of said pulse generating means, said synchronizing means coupled to said pulse generating means and said output circuit of said ring counter thereby modulating the length of said pulses in the output circuit of the pulse generating means as a function of the time of a pulse in said first electrical signal, and a plurality of demodulating means each having a continuous electrical output, each demodulating means being operably coupled with the output circuit of a different one of said pulse generating means whereby the electrical output of each said demodulating means is a function of a different one of said traces.

5. An apparatus according to claim 4 in which said demodulating means includes integrating and differentiating means serially connected to produce an electrical signal having amplitude variations corresponding to the shape of each said trace.

References Cited in the file of this patent

UNITED STATES PATENTS

| | | |
|---|---|---|
| 2,540,144 | Stern | Feb. 6, 1951 |
| 2,557,691 | Rieber | June 19, 1951 |
| 2,638,402 | Lee | May 12, 1953 |
| 2,656,101 | Haviland | Oct. 20, 1953 |
| 2,703,150 | Rieber | Mar. 1, 1955 |
| 2,705,901 | Sherwin | Apr. 12, 1955 |